United States Patent
Colavincenzo et al.

(10) Patent No.: US 11,591,068 B2
(45) Date of Patent: Feb. 28, 2023

(54) WING ASSEMBLY WITH SLATS AND AIRCRAFT

(71) Applicant: BOMBARDIER INC., Dorval (CA)

(72) Inventors: Stephen Colavincenzo, Toronto (CA);
Robby Lapointe, Brossard (CA);
Mohammad Tabesh, Toronto (CA)

(73) Assignee: BOMBARDIER INC., Dorval (CA)

( * ) Notice: Subject to any disclaimer, the term of this patent is extended or adjusted under 35 U.S.C. 154(b) by 204 days.

(21) Appl. No.: 16/896,331

(22) Filed: Jun. 9, 2020

(65) Prior Publication Data
US 2020/0385102 A1     Dec. 10, 2020

Related U.S. Application Data

(60) Provisional application No. 62/859,273, filed on Jun. 10, 2019.

(51) Int. Cl.
*B64C 9/26*     (2006.01)
*B64C 7/00*     (2006.01)

(52) U.S. Cl.
CPC .  *B64C 9/26* (2013.01); *B64C 7/00* (2013.01)

(58) Field of Classification Search
CPC .... B64C 9/26; B64C 7/00; B64C 9/22; B64C 9/20; B64C 9/14
See application file for complete search history.

(56) References Cited

U.S. PATENT DOCUMENTS

| | | | |
|---|---|---|---|
| 4,637,573 A | 1/1987 | Perin et al. | |
| 6,152,404 A | 11/2000 | Flaig et al. | |
| 6,364,254 B1 | 4/2002 | May | |
| 6,454,219 B1 | 9/2002 | Moe | |
| 6,789,769 B2 | 9/2004 | Mau et al. | |
| 8,469,316 B2 | 6/2013 | Hirai et al. | |
| 8,789,798 B2 | 7/2014 | Kafyeke et al. | |
| 9,714,079 B2 | 7/2017 | Isotani et al. | |

(Continued)

FOREIGN PATENT DOCUMENTS

| | | |
|---|---|---|
| CN | 105857576 A | 8/2016 |
| DE | 19743907 C1 | 12/1998 |

OTHER PUBLICATIONS

English Abstract for DE19743907 retrieved on Espacenet on Jun. 8, 2020.

(Continued)

*Primary Examiner* — Philip J Bonzell
*Assistant Examiner* — Ashesh Dangol
(74) *Attorney, Agent, or Firm* — BCF LLP

(57) ABSTRACT

A wing assembly includes a swept wing body, a leading edge of the wing body extending outward and rearward from a wing root to a wing edge; a first slat selectively movably connected to the wing body; and a second slat selectively movably connected to the wing body, the second slat being disposed outboard of the first slat, a flexible sealing member disposed and connected between the first slat and the second slat; at least a portion of the first slat, at least a portion of the second slat, and at least a portion of the flexible sealing member defining a slat gap therebetween, at least a majority of the slat gap being substantially parallel to a predetermined local airflow direction. An aircraft is also disclosed which includes a fuselage; and two oppositely disposed wing assemblies connected to the fuselage.

15 Claims, 11 Drawing Sheets

(56) References Cited

U.S. PATENT DOCUMENTS

2012/0187254 A1* 7/2012 Wollaston .................. B64C 9/22
　　　　　　　　　　　　　　　　　　　　244/214
2017/0152018 A1　 6/2017 Kawai et al.
2019/0016439 A1* 1/2019 Leopold .................... B64C 9/26

OTHER PUBLICATIONS

Lew et al., "Noise Prediction from a Partially Closed Slat Junction", 19th AIAA/CEAS Aeroacoustics Conference, 2013, Germany, pp. 1-26.

English Abstract for CN 105857576 retrieved on Espacenet on Jun. 8, 2020.

* cited by examiner

WING ASSEMBLY WITH SLATS AND AIRCRAFT

CROSS-REFERENCE

The present application claims priority to U.S. Provisional Application No. 62/859,273, filed on Jun. 10, 2019, entitled "Wing Assembly with Slats and Aircraft", the entirety of which is incorporated by reference herein.

FIELD OF TECHNOLOGY

The present technology relates to wing assemblies with slats.

BACKGROUND

With noise reduction regulations becoming more common around airports, it is increasingly important to identify and address sources of noise of aircraft in operation. Especially of interest is noise reduction during take-off and landing, which occur closer to the ground and around airports.

As is presented in *Noise Prediction from a Partially closed Slat Junction* (Lew et al., *American Institute of Aeronautics and Astronautics (AIAA)* publication 2013-2161, hereinafter "Lew"), leading edge slats of fixed-wing aircraft are one notable source of noise during landing. Leading edge slats are small aerodynamic surfaces on the leading edge of a wing used to improve a wing's maximum lift, especially during take-off and landing. When deployed the slats allow the wings of the aircraft to operate at a higher angle of attack in relation to surrounding airflow. Slats are generally partially or fully deployed during take-off and landing and are stowed during cruise portions of flight to minimize drag. As is noted in Lew, airflow over and through the gap formed between two slats (also referred to as the slat junction) when the slats are partially deployed during landing is one identifiable source of noise.

Some solutions to the problem of slat gap noise formation have been proposed. One solution includes providing a rubber seal which extends along a portion of the slat junction between the slats, in order to partially reduce air flowing through the slat junction. The rubber seal generally does not cover the entire slat gap, however, as aft-most portions of the slats retract flush against the wing body.

Such an arrangement is illustrated in FIG. 2. An example prior art wing assembly 15' is shown with slats 50 which are often rectangular in shape when viewed from above. Between the two neighboring slats 50, a rubber seal 52 is has been included to reduce airflow into a forward portion of the space between the slats 50. In order to allow proper retraction of the flaps 50, the rubber seal 52 does not extend along an entirety of the space between the flaps 50. A gap 54 is thus formed aftward of the rubber seal 52 and between the slats 50. The gap 54 is generally aligned normal to a leading edge of the wing body 20' and skewed to a streamwise airflow direction 70.

In order to address the remaining slat gap noise issue in arrangements such as that illustrated in FIG. 2, one proposed solution is to extend the rubber seal between the slats aftward to cover all of the slat junction space between the slats. In such a solution, however, the wing body beneath the slat junction would have to be modified to accommodate the rubber seal in order for the slats to retract fully.

Consequently, there is a desire for a configuration for fixed-wing aircraft that aids in reduction of the noise generation due to the slat gap between two partially deployed slats.

SUMMARY

It is an object of the present technology to ameliorate at least some of the inconveniences present in the prior art.

According to one non-limiting aspect, there is provided a wing assembly including a swept wing body, a leading edge of the wing body extending outward and rearward from a wing root to a wing edge; a first slat selectively movably connected to the wing body, the first slat including: a first leading edge and a first trailing edge; a first inboard edge extending between the first leading edge and the first trailing edge and a first outboard edge extending between the first leading edge and the first trailing edge, the first outboard edge including: a first forward side portion extending from the first leading edge to a first intermediate point between the first leading edge and the first trailing edge, and a first aft side portion extending from the first intermediate point to the first trailing edge; and a second slat selectively movably connected to the wing body, the second slat being disposed outboard of the first slat, the second slat including: a second leading edge and a second trailing edge; a second outboard edge extending between the second leading edge to the second trailing edge; and a second inboard edge extending between the second leading edge to the second trailing edge, the second inboard edge including: a second forward side portion extending from the second leading edge to a second intermediate point between the second leading edge and the second trailing edge, and a second aft side portion extending from the second intermediate point to the second trailing edge; the first slat and the second slat defining a slat gap between the first aft side portion and the second aft side portion, the slat gap being substantially parallel to a predetermined local airflow direction.

In some embodiments, the first leading edge defines a first leading edge line connecting forward-most points of the first slat and extending between a first inboard end and a first outboard end; the first trailing edge defines a first trailing edge line connecting aft-most points of the first slat and extending between the first inboard end and the first outboard end, the first trailing edge being disposed at a first chord distance from the first leading edge; the first leading edge line and the first trailing edge line define a first slat plane, the first chord distance between the first leading edge and the first trailing edge extending normal to the first leading edge, the first chord distance being measured along the first slat plane; a projection of the first forward side portion onto the first slat plane defines a first forward side line; a projection of the first aft side portion onto the first slat plane defining a first aft side line; a second leading edge defines a second leading edge line connecting forward-most points of the second slat and extending between a second inboard end and a second outboard end; a second trailing edge defines a second trailing edge line connecting aft-most points of the second slat and extending between the second inboard end and the second outboard end, the second trailing edge being disposed at a second chord distance from the second leading edge; the second leading edge line and the second trailing edge line defining a second slat plane, the second chord distance between the second leading edge and the second trailing edge extending normal to the second leading edge, the second chord distance being measured along the second slat plane; a projection of the second forward side portion onto the second slat plane defines a second forward side line; a projection of the second aft side portion onto the second slat plane defines a second aft side line; and the first aft side line and the second aft side line are substantially parallel to a predetermined local airflow direction.

In some embodiments, the wing assembly further includes a flexible sealing member disposed between the first slat and the second slat, the flexible sealing member extending from the first and second leading edges to the first and second intermediate points.

In some embodiments, a forward edge of the slat gap is defined by a trailing edge of the flexible sealing member.

In some embodiments, the flexible sealing member is a rubber seal connected between the first forward side portion and the second forward side portion.

In some embodiments, the first trailing edge line is longer than the second trailing edge line.

In some embodiments, the first leading edge line and the second leading edge line are equal in length; and a surface area of the first slat plane is greater than a surface area of the second slat plane.

In some embodiments, the first aft side line and the second aft side line are substantially parallel to a longitudinal centerline of the aircraft when the wing assembly is installed on the aircraft.

In some embodiments, the first chord distance and the second chord distance are equal in length.

In some embodiments, each of the first forward side line and the second forward side line extend for at least 65% of the first chord distance.

In some embodiments, each of the first forward side line and the second forward side line extend for 95% or less of the first chord distance.

In some embodiments, the first forward side line is a straight line; and the second forward side line is a straight line.

In some embodiments, the first aft side line is a straight line; and the second aft side line is a straight line.

In some embodiments, an outboard side of the first forward side line and an outboard side of the first aft side line define a first angle therebetween; an outboard side of the second forward side line and an outboard side of the second aft side line define a second angle therebetween; the first angle is less than 175 degrees; and the second angle is less than 175 degrees.

In some embodiments, the first angle is greater than 135 degrees; and the second angle is greater than 135 degrees.

In some embodiments, the first angle is equal to the second angle.

In some embodiments, orientation of the slat gap causes a reduction in noise when the wing assembly is installed on the aircraft, the first and second slats are in an intermediate position, and air is flowing over the wing assembly compared to an other swept wing assembly with a pair of other slats forming a gap co-linear with corresponding forward side lines of the other slats.

In some embodiments, the predetermined local airflow direction is aligned with a streamwise direction of airflow.

In some embodiments, the predetermined local airflow direction is aligned with a direction of airflow impacting at least one of the first leading edge and the second leading edge, when the wing assembly is installed on an aircraft and the aircraft is in operation.

According to another non-limiting aspect, there is provided an aircraft including a fuselage; and two oppositely disposed wing assemblies connected to the fuselage, each of the two oppositely disposed wing assemblies being a wing assembly according to any of the above embodiments.

According to another non-limiting aspect, there is provided a wing assembly including a swept wing body, a leading edge of the wing body extending outward and rearward from a wing root to a wing edge; a first slat selectively movably connected to the wing body; and a second slat selectively movably connected to the wing body, the second slat being disposed outboard of the first slat, a flexible sealing member disposed and connected between the first slat and the second slat; at least a portion of the first slat, at least a portion of the second slat, and at least a portion of the flexible sealing member defining a slat gap therebetween, at least a majority of the slat gap being substantially parallel to a predetermined local airflow direction.

For purposes of this application, terms related to spatial orientation such as forwardly, aftwardly, upwardly, downwardly, left, and right, are as they would normally be understood by a pilot of the aircraft sitting therein in a normal piloting position. Terms related to spatial orientation when describing or referring to components or sub-assemblies of the aircraft, separately from the aircraft, such as a wing assembly for example, should be understood as they would be understood when these components or sub-assemblies are mounted to the aircraft, unless specified otherwise in this application.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of embodiments of the present technology will become apparent from the following description and the accompanying drawings.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
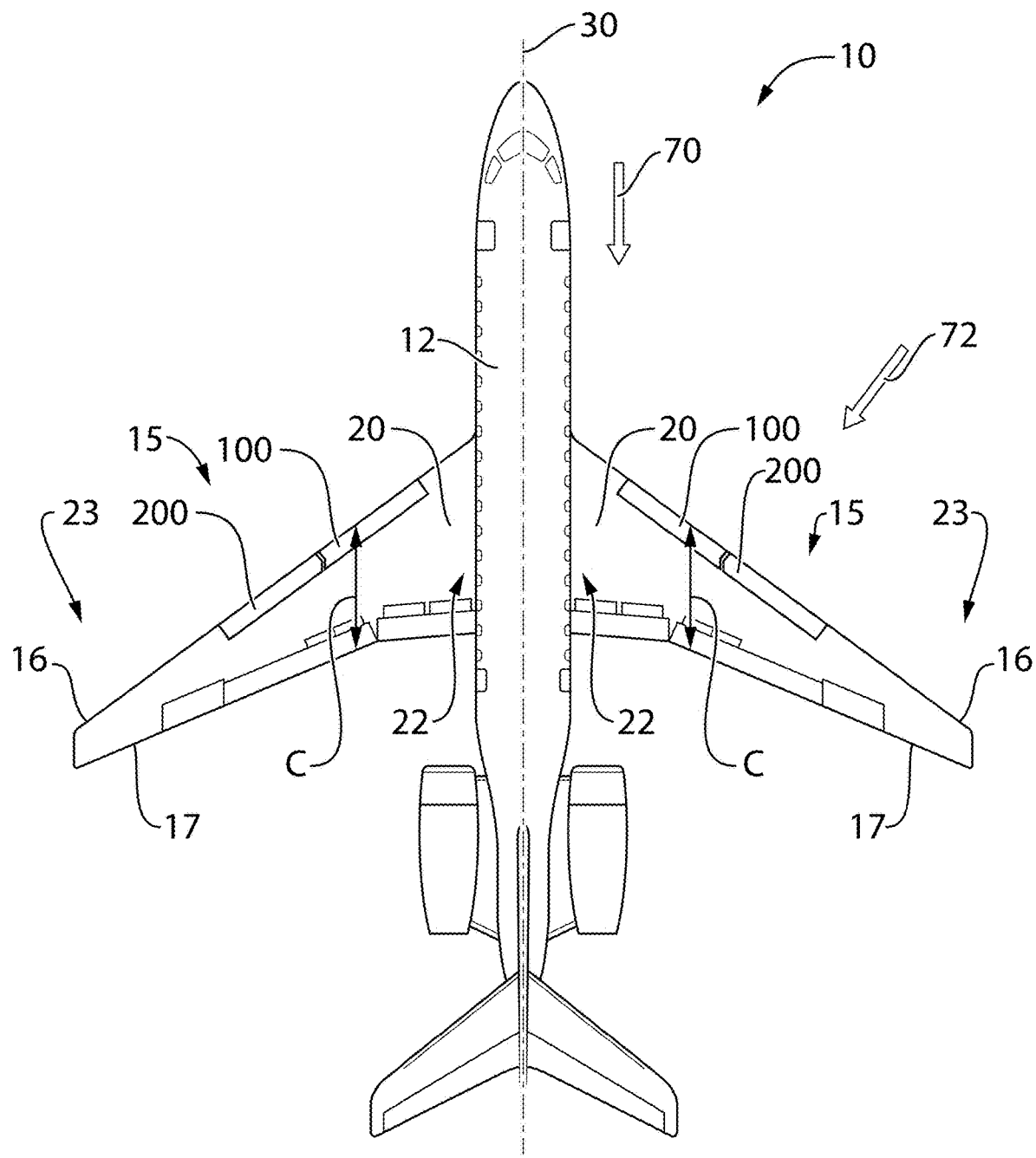
FIG. 1 is a top plan view of an aircraft.
Figure 2:
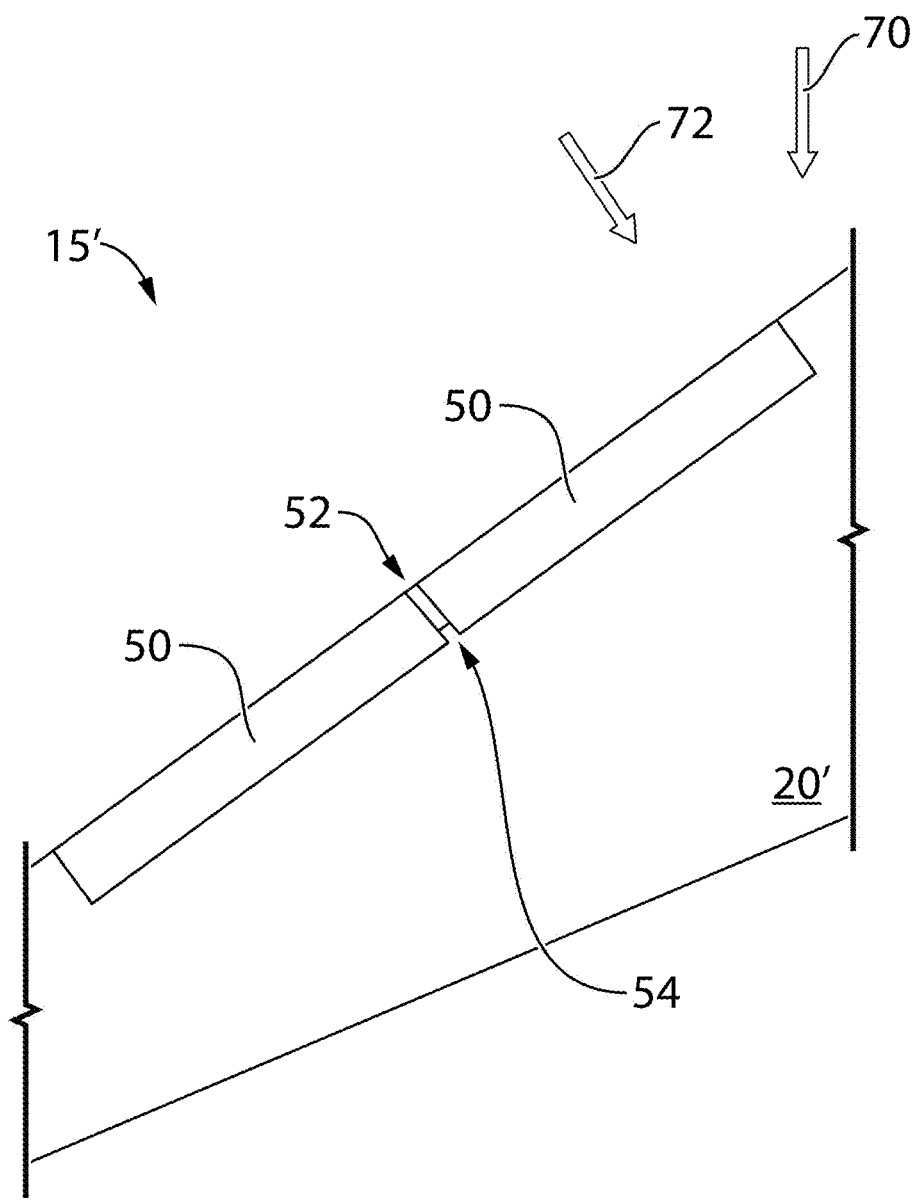
FIG. 2 is a top plan view of a portion of a left wing assembly of a prior art aircraft with a pair of slats.

FIG. 1 shows a top view of a fixed-wing jet aircraft 10 according to the present technology. The aircraft 10 includes a fuselage 12 (the body of the aircraft 10). A longitudinal centerline 30 of the aircraft 10 extends along a center of the fuselage 12, from forward to aft of the aircraft 10. Connected to the fuselage 12 are two oppositely disposed wing assemblies 15, also referred to as wings 15. The wing assemblies 15 produce lift and therefore flight of the aircraft 10 during operation.

Each wing assembly 15 includes a wing body 20 that extends from a wing root 22 to wing tip 23. The wing body 20 of the present technology is a swept wing body 20, where a leading edge 16 of the wing 15 extends rearward as the wing body 20 extends outboard from the wing root 22. Each wing assembly 15 includes the leading edge 16, as well as a trailing edge 17. The size of the wing assembly 15, from the leading edge 16 to the trailing edge 17, is determined using a mean aerodynamic chord ("MAC"), represented by a chord "C", measured in a direction of nominal streamwise airflow 70. Those skilled in the art will understand that since most wings change their chord over their span (as is the case for the wing assemblies 15 illustrated in FIG. 1), the mean aerodynamic chord (MAC) is used to compare different wing configurations. In general, more lift is generated on the wider inboard sections of the wing assembly 15 as compared to the narrow outboard sections of the wing assembly 15. Those skilled in the art will also understand that each wing assembly 15 includes a particular airfoil, or shape, of the wing assembly 15.

Each wing assembly 15 includes two slats 100, 200, described in more detail below. The wing assemblies 15 could include additional slats in some embodiments, which could be implemented according to known configurations or the present embodiments. It is also contemplated that the wing assemblies 15 could include one or more flaps, fairings, ailerons, and various other relevant structures, depending on specifics of any given embodiment.

With reference to FIGS. 3 through 7, the wing assemblies 15 according to the present technology will now be described in more detail. The slats 100, 200 of the wing assemblies 15 are shaped and arranged to help address the issue of noise created due to air flowing into and over the gap 54 of the prior art, especially when the slats 50 are partially deployed during landing.

Figure 3:
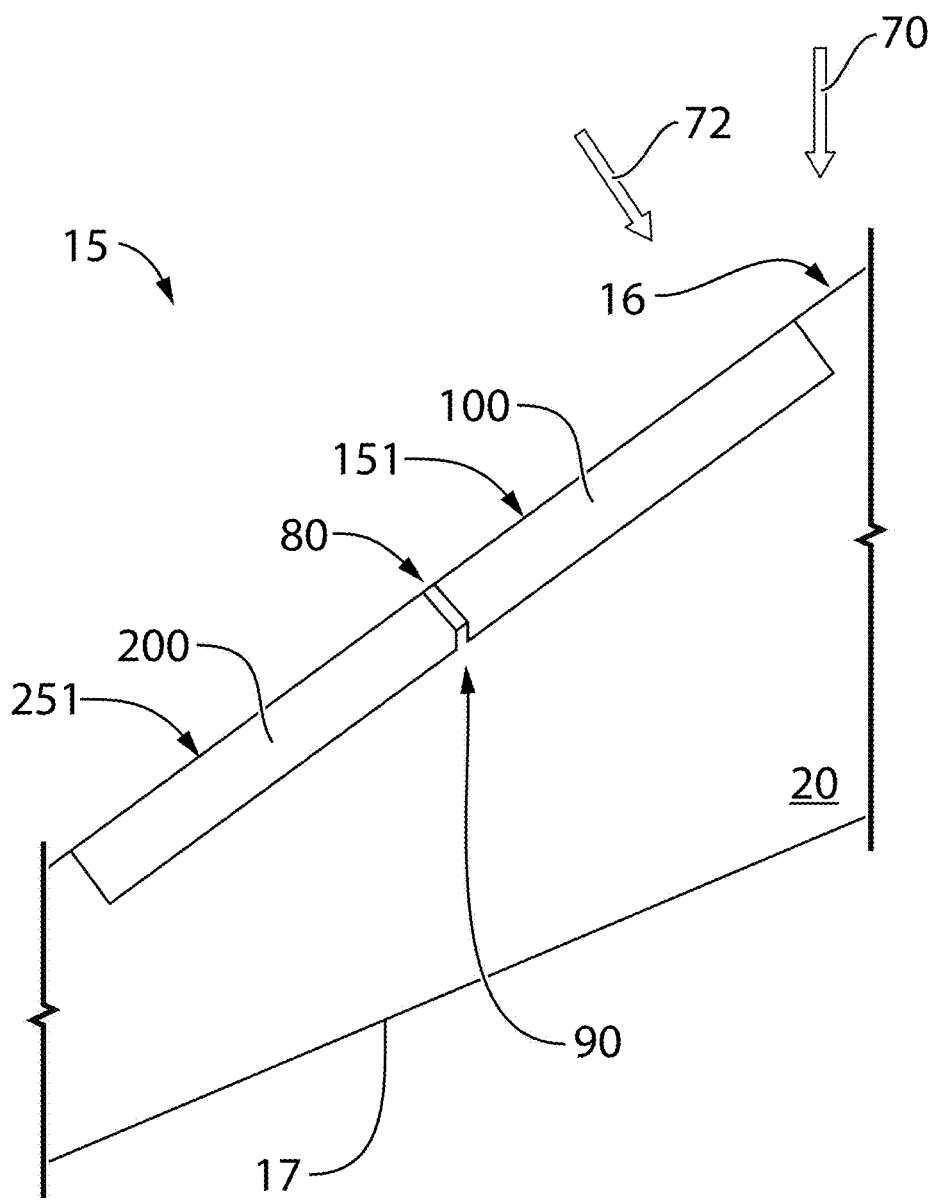
FIG. 3 is a top plan view of a portion of a left wing assembly of the aircraft of FIG. 1, the wing assembly including a pair of slats according to the present technology.

Specifics of the wing assemblies 15 will be described with respect to the left wing assembly 15 as shown in FIG. 3, the right wing assembly 15 being a mirror image of the left wing assembly 15. In some embodiments, it is contemplated that the wing assemblies 15 may not be mirror images of each other.

The wing assembly 15 includes the slats 100, 200 as mentioned above. The slat 200 is disposed neighboring and outboard of the slat 100. The slats 100, 200 are not in direct contact, but are separated by about 1 inch (2.54 cm). It is contemplated that the slats 100, 200 could be disposed closer together or farther apart, generally between 0.5 and 1 inch (1.27 and 2.54 cm), depending on the particular embodiment.

The slats 100, 200 are selectively movably connected to the wing body 20 on a forward, top side of the wing body 20. The slats 100, 200 are selectively movable to a plurality of positions along a direction 72 normal to the wing leading edge 16 (also referred to as a hingewise direction 72). The plurality of positions includes at least a retracted position, a deployed position, and one or more intermediate positions intermediate the retracted and deployed positions. In the retracted position, the slats 100, 200 are in their aft-most position with respect to the wing body 20. The slats 100, 200 are structured to lie as flush as possible with the wing body 20 in order to minimize drag when in the retracted position. In the deployed position, the slats 100, 200 are in their most forward extended position with respect to the wing body 20. The intermediate position(s) are also variously referred to as partially deployed positions or partially retracted positions. Depending on the particular embodiment, the slats 100, 200 could be movable to one or many different intermediate positions.

The slats 100, 200 are selectively deployed and retracted along the normal direction 72 in unison, although in some embodiments it is contemplated that the slats 100, 200 could be moved at least partially independently. The slats 100, 200 are illustrated in their retracted position in the Figures, where leading edges 151, 251 of the slats 100, 200 are aligned with the leading edge 16 of the wing 15.

In order to better understand the individual structures of the slats 100, 200, details of their overall form will now be described with reference to FIGS. 4 and 5.

Figure 4:
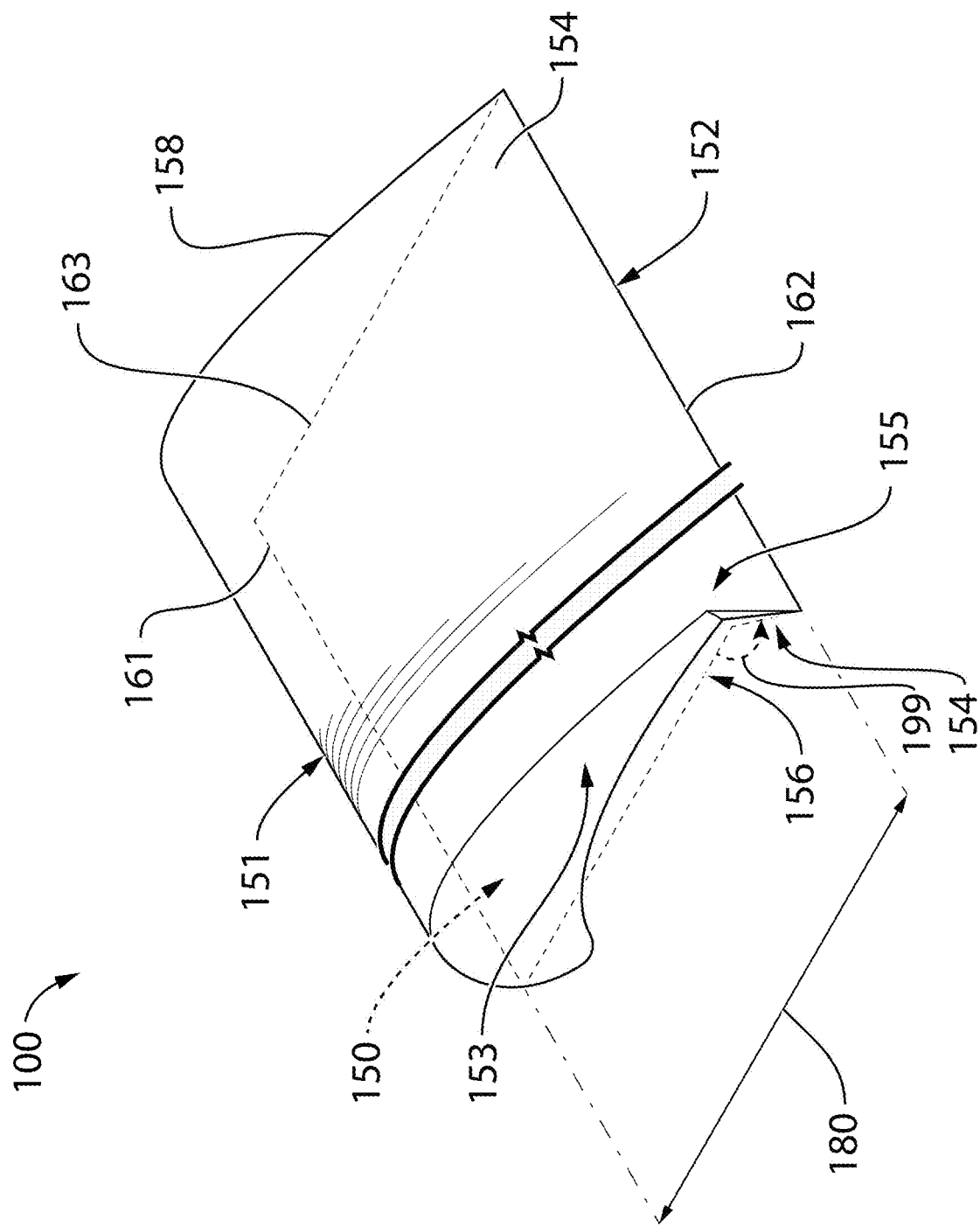
FIG. 4 is a top, rear, and left side perspective view of an inboard slat of FIG. 3.
Figure 6:
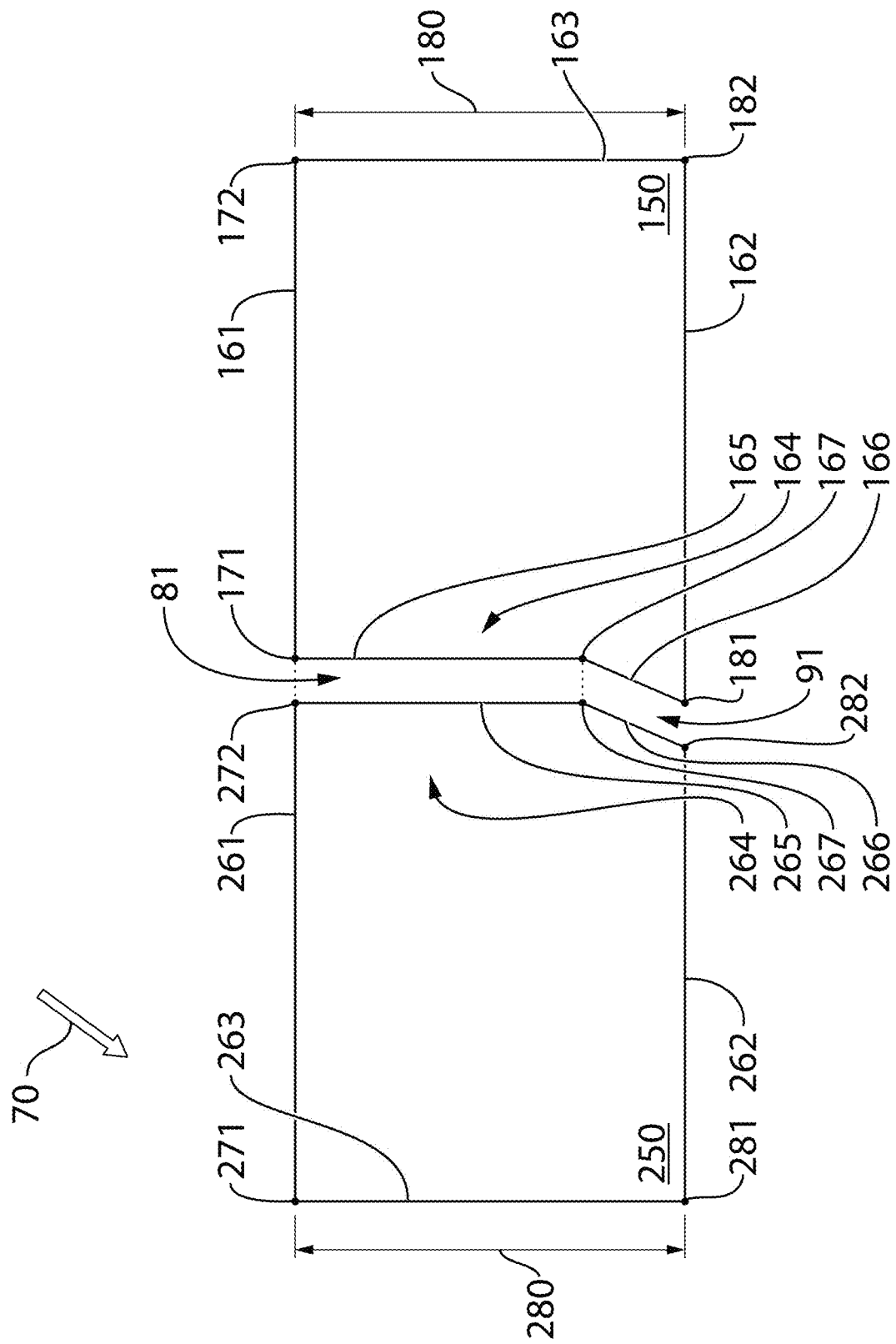
FIG. 6 is a top plan view of a projection of the slats of FIG. 3.

In FIG. 4, the slat 100 is illustrated in isolation. The slat 100 includes a leading edge 151 that defines a leading edge line 161 connecting forward-most points of the slat 100. The leading edge 151 makes up part of the wing leading edge 16 when the slat 100 is in the retracted position. The leading edge line 161 extends between an inboard end 172 and an outboard end 171 (FIG. 6). Opposite the leading edge 151, the slat 100 includes a trailing edge 152 defining a trailing edge line 162 connecting aft-most points of the slat 100. The trailing edge line 162 similarly extends between an inboard end 182 and an outboard end 181 (FIG. 6).

The leading edge line 161 and the trailing edge line 162 define a slat plane 150 which will be described in more detail below. It should be noted that the slat plane 150 is simply a geometric construct to aid in understanding the overall geometry of the slat 100. The trailing edge line 162 is disposed at a chord distance 180 (FIG. 6) from the leading edge line 161 in the direction 72, where the chord distance 180 extends normal to the leading edge line 161 and is measured along the slat plane 150. In some embodiments, chord distance between the leading edge line 161 and the trailing edge line 162 could vary from inboard to outboard ends, and in such a case the chord distance 180 can be determined using the mean aerodynamic chord.

On an inboard side of the slat 100 is an inboard edge 158 extending substantially perpendicularly from the leading edge 151 to the trailing edge 152. Opposite the inboard edge 158 is an outboard edge 156, similarly extending from the leading edge 151 to the trailing edge 152. The outboard edge 156 includes a forward side portion 153 extending from the leading edge 151 to an intermediate point 155. The forward side portion 153 is parallel to the inboard edge 158, although it is contemplated that this may not be the case for all embodiments. The outboard edge 156 further includes an aft side portion 154 extending from the intermediate point 155 to the trailing edge 152.

Figure 5:
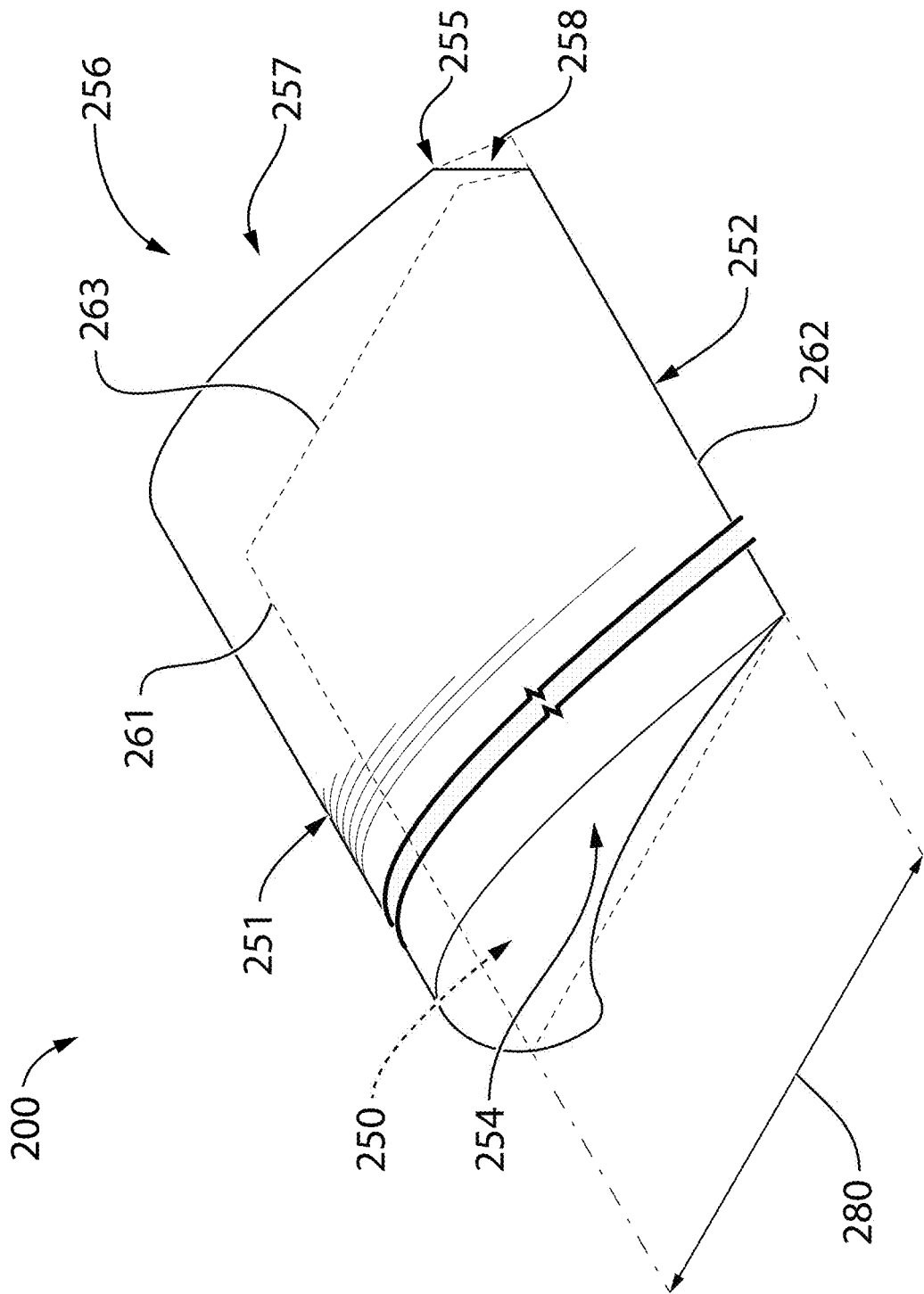
FIG. 5 is a top, rear, and left side perspective view of an outboard slat of FIG. 3.

In FIG. 5, the slat 200 is shown in isolation and will be described in more detail. The slat 200 includes a leading edge 251 which is part of the wing leading edge 16 when in the retracted position. The leading edge 251 defines a leading edge line 261 connecting forward-most points of the slat 200. The leading edge line 261 extends between an inboard end 272 and an outboard end 271 (FIG. 6). Opposite the leading edge 251, the slat 200 includes a trailing edge 252 defining a trailing edge line 262 connecting aft-most points of the slat 200. The trailing edge line 262 similarly extends between an inboard end 282 and an outboard end 281.

The leading edge line 261 and the trailing edge line 262 define a slat plane 250. It should be noted that the slat plane 250 is similarly simply a geometric construct to aid in understanding the overall geometry of the slat 200. The trailing edge line 262 is disposed at a chord distance 280 from the leading edge line 261 in the normal direction 72, where the chord distance 280 extends normal to the leading edge line 261 and is measured along the slat plane 250. In some embodiments, chord distance between the leading edge line 261 and the trailing edge line 262 could vary from inboard to outboard ends, and in such a case the chord distance 280 can be determined using the mean aerodynamic chord.

On an outboard side of the slat 200 is an outboard edge 254 extending substantially perpendicularly from the leading edge 251 to the trailing edge 252. Opposite the outboard edge 254 is an inboard edge 256, similarly extending from the leading edge 251 to the trailing edge 252. The inboard edge 256 includes a forward side portion 257 extending from the leading edge 251 to an intermediate point 255. The forward side portion 257 is parallel to the inboard edge 254, although it is contemplated that this may not be the case for all embodiments. The inboard edge 256 further includes an aft side portion 258 extending from the intermediate point 255 to the trailing edge 252.

As is mentioned above, the slats 100, 200 are not in contact but are instead separated by a small space (relative to the overall size of the slats 100, 200). In order to help mitigate drag and noise caused by air flowing into and through the space between the slats 100, 200, the wing assembly 15 includes a flexible sealing member 80 (FIG. 3) which bridges a portion of the space between the slats 100, 200. The flexible sealing member 80 is connected between the forward side portion 153 of the outboard edge 156 of the slat 100 and the forward side portion 257 of the inboard edge 256 of the slat 200. The flexible sealing member 80 extends from the leading edges 151, 251 to the intermediate points 155, 255.

Depending on the embodiment, the flexible sealing member 80 could cover only a portion of the space between the forward side portions 153, 257. In the present embodiment, the flexible sealing member 80 is a rubber seal 80. In other embodiments, the flexible sealing member 80 could be made of different material, including but not limited to rubber or other polymer materials.

Aftward of the flexible sealing member 80 and the forward side portions 153, 257, the slats 100, 200 define a slat gap 90 therebetween. Specifically, the slat gap 90 is defined between the aft side portion 154 and the aft side portion 258.

According to the present invention, the aft side portions 154, 258 of the slats 100, 200 are arranged such that the slat gap 90 is generally aligned with a pre-determined local airflow direction. The predetermined local airflow direction is the direction in which air is expected to flow over the slats 100, 200 when the aircraft 10 is in use, and more particularly when the slats 100, 200 are in the intermediate or deployed position (e.g. during landing). For instance, the predetermined local airflow direction could be considered to be a direction aligned with a direction of airflow impacting the leading edges 151, 251 of the slats 100, 200. The predetermined local airflow direction is determined for the particular embodiment of the wing assembly 15 based on various characteristics of the wing assembly 15, including but not limited to: wing shape, angle of wing sweep, distance between the slats 100, 200 and the wing root 22 and/or wing tip 23, expected wing deflection, and Angle of Attach (AoA), velocity, or flow conditions, among other possibilities. In the illustrated embodiment, the predetermined local airflow direction, and thus the slat gap 90, is aligned with the nominal airflow direction 70. In other words, the slat gap 90 is aligned with a streamwise direction of air flow. In other embodiments, however, the predetermined local airflow direction may not be aligned with the nominal airflow direction 70.

As is mentioned above, alignment of the slat gap 90 along the direction of the air flowing over the slat gap 90 has been found to aid in decreasing noise produced by the swept wing assembly 15. This is especially applicable when the slats 100, 200 are in the intermediate or deployed position, such as when the aircraft 10 is landing, and the slat gap 90 is not retracted flush or nearly flush against the wing body 20.

As the slats 100, 200 have curved top and bottom surfaces, a further understanding of the overall shape of the slats 100, 200, as well as the slat gap 90 formed therebetween, can be gained by inspecting projections of the slats 100, 200 onto the slat planes 150, 250. The projections onto the slat planes 150, 250 are illustrated in FIGS. 6 and 7.

As is mentioned above, the slat plane 150 is defined by the leading edge line 161 and the trailing edge line 162 and the slat plane 250 is defined by the leading edge line 261 and the trailing edge line 262. As the slat planes 150, 250 are simply geometric constructs to aid in understanding the overall geometry of the slats 100, 200, as noted above, the slat planes 150, 250 will generally be treated as belonging to a same plane even though the planes 150, 250 as defined above may not always lie in exactly the same plane. In some embodiments, the leading edge lines 161, 261 and the trailing edge lines 162, 262 may define intersecting planes or parallel planes.

For the slat 100, a projection onto the slat plane 150 of the inboard edge 158 defines an inboard side line 163 and a projection onto the slat plane 150 of the outboard edge 156 defines an outboard side line 164. Just as the outboard edge 156 is formed from the two edge portions 153, 154, the outboard side line 165 includes two line portions. A projection of the forward side portion 153 onto the slat plane 150 defines a forward side line 165, extending from the leading edge 161 to a projection 167 of the intermediate point 155. A projection of the aft side portion 154 of the outboard edge 156 onto the slat plane 150 defines an aft side line 166, extending from the projected intermediate point 167 to the trailing edge line 162.

Figure 7:
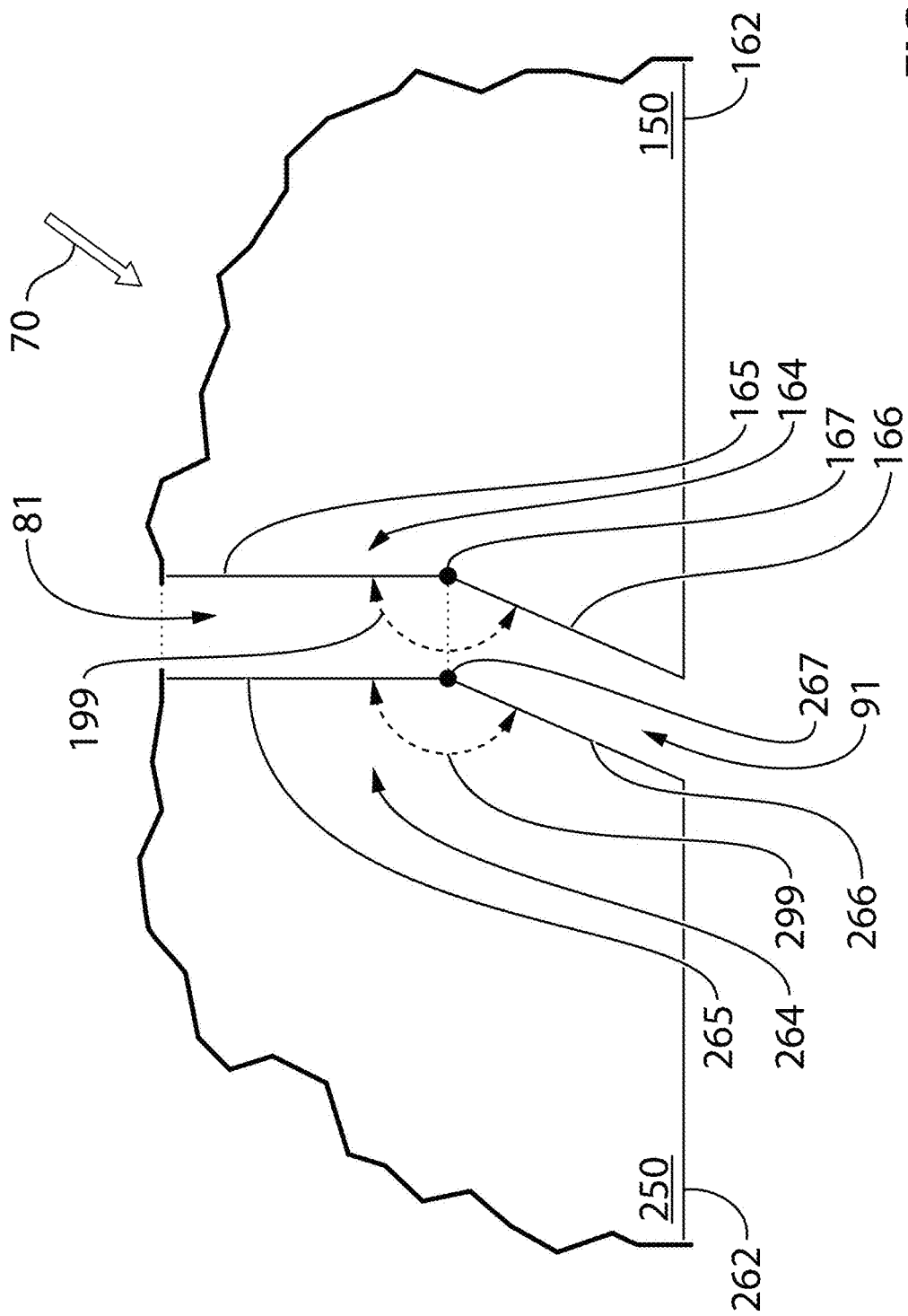
FIG. 7 is a close-up, partial view of the projection of FIG. 6.

The aft side line 166 is disposed at the angle 199 to the forward side line 165, as measured on the outboard side of the lines 165, 166 (FIG. 7). The aft side line 166 extends both outboard and toward the trailing edge 162 as it extends from the projected intermediate point 167. The angle 199 is about 150 degrees as illustrated in the present embodiment, but this is simply one non-limiting example. It is contemplated that the angle 199 could vary from greater than 135 degrees to less than 175 degrees.

For the slat 200, a projection onto the slat plane 250 of the outboard edge 254 defines an outboard side line 263 and a projection onto the slat plane 250 of the inboard edge 256 defines an inboard side line 264. Just as the inboard edge 256 is formed from the two edge portions 257, 258, the inboard side line 264 includes two line portions. A projection of the forward side portion 257 of the inboard edge 256 onto the slat plane 250 defines a forward side line 265, extending from the leading edge 261 to a projection 267 of the intermediate point 255. Similarly, a projection of the aft side portion 258 of the inboard edge 256 onto the slat plane 250 defines an aft side line 266, extending from the projected intermediate point 267 to the trailing edge line 262.

The aft side line 266 is disposed at the angle 299 to the forward side line 265, as measured on the outboard side of the lines 265, 266 (FIG. 7). The aft side line 266 extends both outboard and toward the trailing edge 262 as it extends from the projected intermediate point 267. The angle 299 is about 150 degrees as illustrated, but this is simply one non-limiting embodiment. It is contemplated that the angle 299 could vary from greater than 135 degrees to less than 175 degrees.

A projection of the flexible sealing member 80 onto the plane containing the slat planes 150, 250 defines a sealing member projection 81. Similarly, a projection of the slat gap 90 onto the plane containing the slat planes 150, 250 defines a slat gap projection 91. The slat gap projection 91 is defined between the aft side lines 167, 267 and an aft side of the sealing member projection 81.

In the present embodiment, the angle 299 is equal to the angle 199 such that the aft side lines 166, 266 are parallel to each other, although this may not be the case for every embodiment. The aft side lines 166, 266 are both parallel to the centerline 30 of the aircraft 10, although this similarly may not be the case in some embodiments, and may depend on the predetermined local airflow direction. Specifically, with the slat gap 90 generally aligned with the predetermined local airflow direction, the aft side lines 166, 266 are both substantially parallel to the predetermined local airflow direction.

In the present embodiment, the slats 100, 200 (as seen illustrated by the projections onto the slat planes 150, 250) are similarly designed but differences induced by the arrangement of the slat gap 90 cause the slats 100, 200 to have different dimensions. Specifically, the leading edge lines 161, 261 are equal in length and the chord distances 180, 280 are also equal in length. However, due to the angles of the aft side lines 166, 266 relative to the forward side lines 265, 265, the trailing edge line 162 is longer than the trailing edge line 262, the leading edge line 161 is shorter than the trailing edge line 162, and the leading edge line 261 is longer than the trailing edge line 262. As such, a surface area of the slat plane 150 is greater than a surface area of the slat plane 250. In some embodiments, it is contemplated that the leading edge lines 161, 261 and/or the chord distances 180, 280 may differ in length. Further, if the leading edge lines 161, 261 and/or the chord distances 180, 280 differ in length, it is possible that the slat planes 150, 250 could have equal surface areas, even in view of the differing lengths of the trailing edge lines 162, 262.

As illustrated in FIG. 7, the side lines 165, 166, 265, 266 are straight lines, although it is contemplated that the side lines 165, 166, 265, 266 may take different forms. Further, the length of the forward side lines 165, 265 and the aft side lines 166, 266 could vary in different embodiments of the present technology.

Depending on the embodiment, the overall size of the slat gap 90 (and the projected slat gap 91) could vary. The forward side lines 165, 265 generally extend from the leading edge lines 161, 261 to the projected intermediate points 167, 267 for 95% or less of the length of the slat chord distance 180, 280. In accordance with the present technology, the forward side lines 165, 265 extend from the leading edge lines 161, 261 to the projected intermediate points 167, 267 for at least 65% of the length of the chord distances 180, 280. It is contemplated that the forward side lines 165, 265 could be longer or shorter, depending on the particular embodiment, and as such the slat gap 90 and the projected slat gap 91 could be conversely shorter or longer. It is also contemplated that the slat gap 90 could be longer or shorter, depending on the angles 199, 299.

With further reference to FIGS. 8 to 11, further details of the effects of the arrangement of the slat gap 90 on noise and air perturbations will now be described in more detail.

Figure 8:
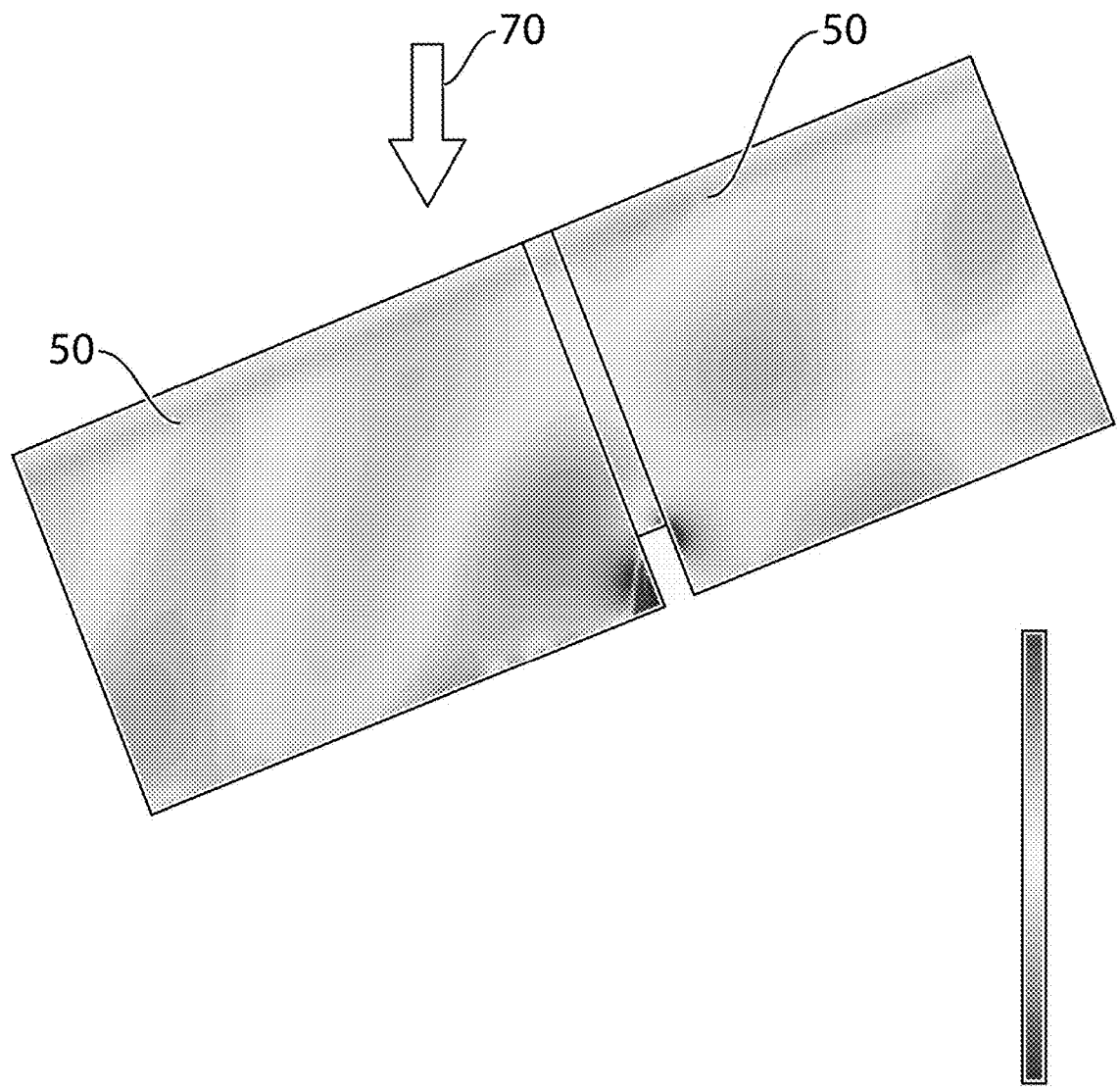
FIG. 8 is a top plan view of the prior art pair of slats of FIG. 2, illustrating simulated pressure fluctuations when in use.
Figure 9:
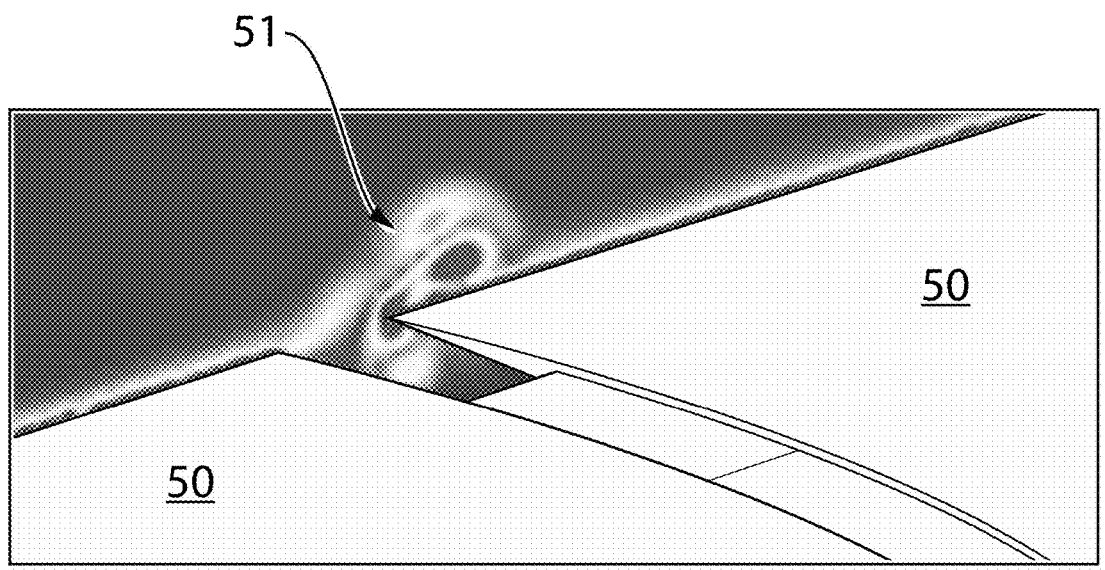
FIG. 9 is a front, left side perspective view of the prior art slats of FIG. 2, illustrating simulated air perturbations when in use.
Figure 9:
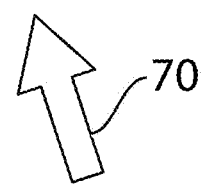

To provide an understanding of at least some noise sources created by prior art slat gaps, such as the prior art slat gap 54, simulated pressure fluctuations and simulated airflow perturbations for the prior art slat arrangement are illustrated in FIGS. 8 and 9. During operation of an aircraft with the wing assemblies 15', air flowing over the wing assemblies 15' in the streamwise direction 70 encounters the slat gap 54 at an angle. This cross-flow over and into the slat gap 54 causes both significantly higher pressure fluctuations along portions of the edges of the slat gap 54 (dark zones in FIG. 8), as well as strong vortex shedding along rear edges of the slat gap 54 (FIG. 9). As can be seen in the Figure, vortices 51 created by the cross-flow across the slat gap 54 are either impacting or nearly impacting the trailing edge of the outboard slat 50. Both the strong pressure fluctuations and the impaction of the vortices 51 on the slats 50 are sources of noise during operation, specifically during partial deployment, of the slats 50.

It should be noted that the above noise will generally not be encountered by a non-swept wing employing the prior art slats 50 and the corresponding slat gap 54. In the non-swept wing, leading edges of the slats 50 would be generally orthogonal to the streamwise airflow direction 70, and thus the slat gap 54 would be aligned with the streamwise airflow direction 70. Without the cross-flow over and into the slat gap 54, the pressure differentials and vortices described above will generally not be created (or at least not to the same extent).

Figure 10:
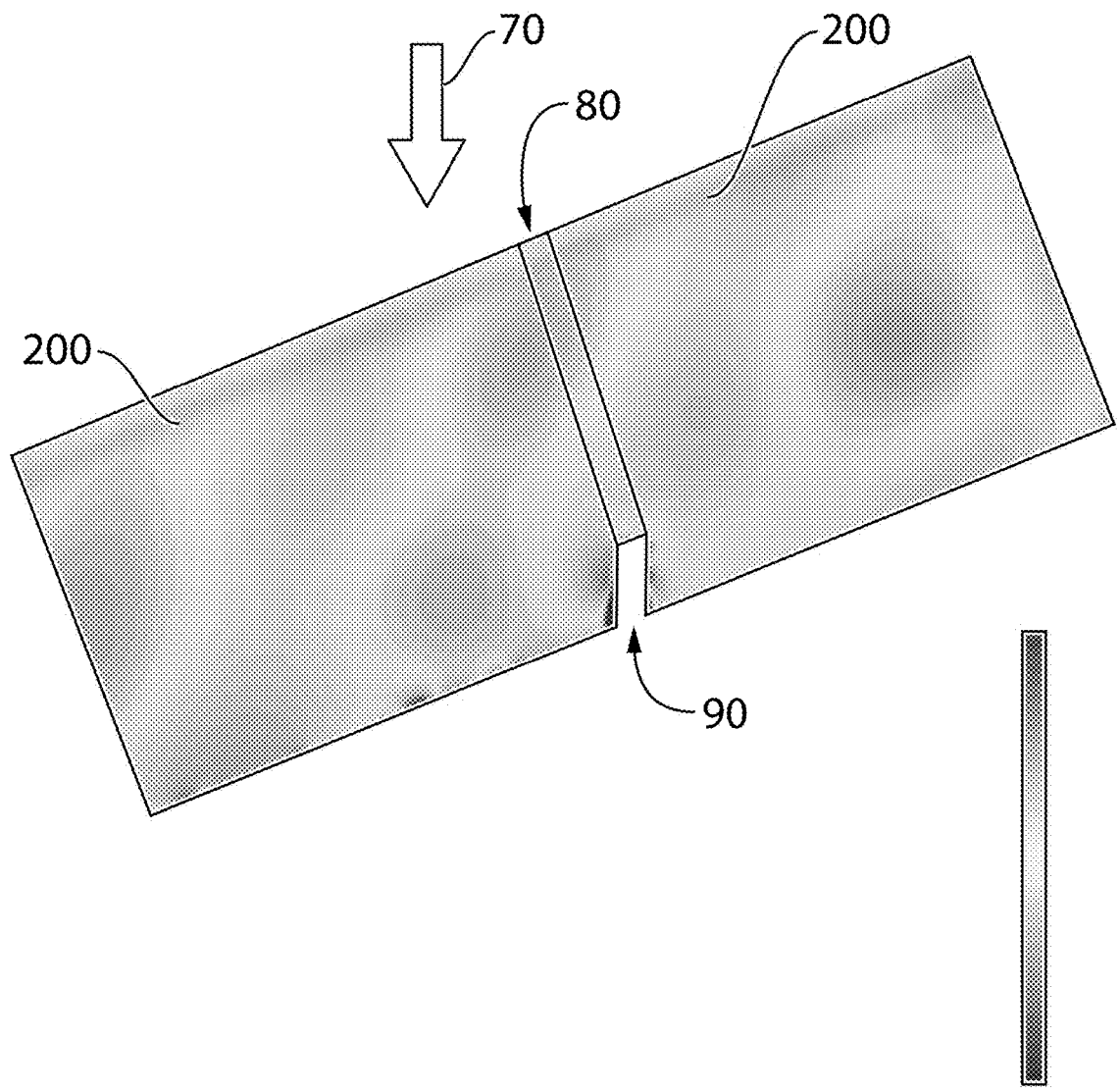
FIG. 10 is a top plan view of the pair of slats of FIG. 3, illustrating simulated pressure fluctuations when in use.
Figure 11:
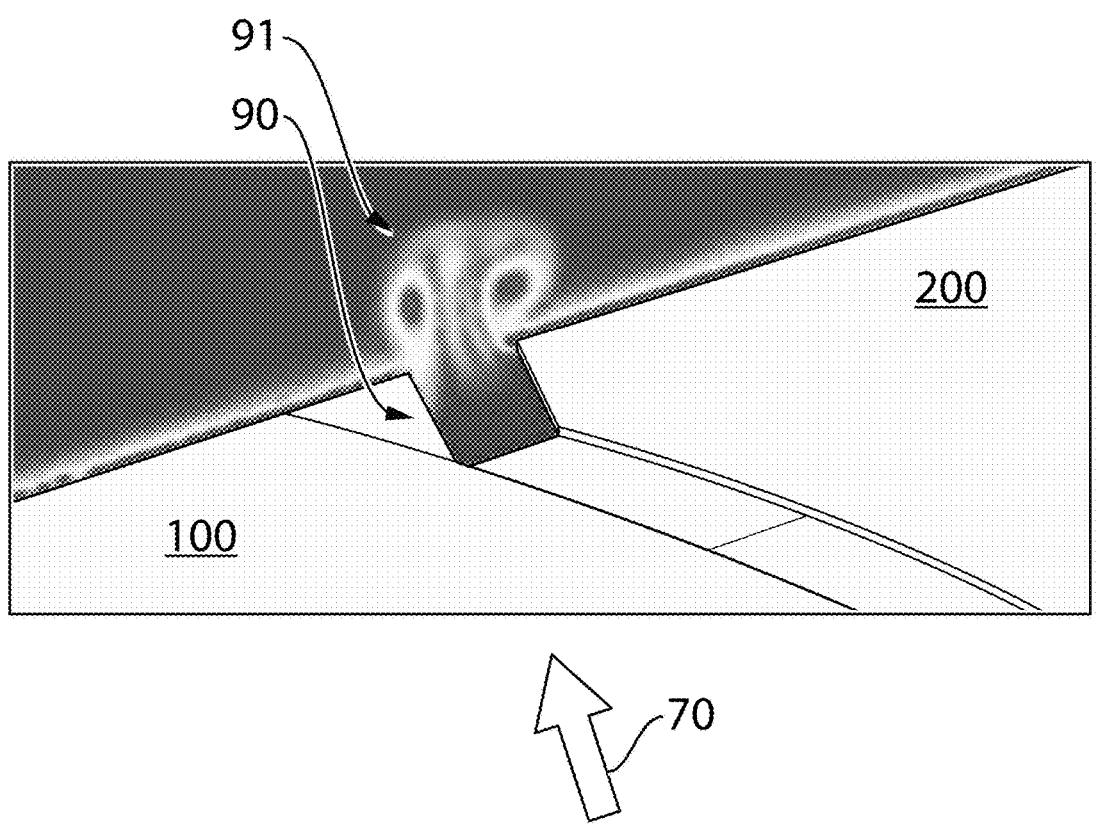
FIG. 11 is a front, left side perspective view of the pair of slats of FIG. 3, illustrating simulated air perturbations when in use.

Similar pressure fluctuation and airflow perturbation simulations for the slat gap 90 of the present technology are illustrated in FIGS. 10 and 11. As the slat gap 90 is aligned with the streamwise airflow direction 70, cross-flow over and into the slat gap 90 is greatly reduced. As such, the lateral extent and amplitude of the pressure fluctuations (dark regions) on and along the slats 100, 200 are reduced, thus creating less noise during operation. Similarly, noise from vortices 91 created at the edges of the slat gap 90 is reduced as the vortices 91 are also reduced in strength. As can be seen in FIG. 11, the vortices 91 also form farther away from the surfaces of the slats 100, 200 which further reduces noise created by the slat gap 90 (as compared to the prior art slat gap 50) during operation.

The wing assembly 15 and the airplane 10 implemented in accordance with some non-limiting embodiments of the present technology can be represented as presented in the following numbered clauses.

CLAUSE 1: A wing assembly (15) comprising: a swept wing body (20), a leading edge (16) of the wing body (20) extending outward and rearward from a wing root (22) to a wing tip (23); a first slat (100) selectively movably connected to the wing body (20), the first slat (100) including: a first leading edge (151) and a first trailing edge (152); a first inboard edge (158) extending between the first leading edge (151) and the first trailing edge (152) and a first outboard edge (156) extending between the first leading edge (151) and the first trailing edge (152), the first outboard edge (156) including: a first forward side portion (153) extending from the first leading edge (151) to a first intermediate point (155) between the first leading edge (151) and the first trailing edge (152), and a first aft side portion (154) extending from the first intermediate point (155) to the first trailing edge (152); and a second slat (200) selectively movably connected to the wing body (20), the second slat (200) being disposed outboard of the first slat (100), the second slat (200) including: a second leading edge (251) and a second trailing edge (252); a second outboard edge (254) extending between the second leading edge (251) to the second trailing edge (252); and a second inboard edge (256) extending between the second leading edge (251) to the second trailing edge (252), the second inboard edge (256) including: a second forward side portion (257) extending from the second leading edge (251) to a second intermediate point (255) between the second leading edge (251) and the second trailing edge (252), and a second aft side portion (258) extending from the second intermediate point (255) to the second trailing edge (252); the first slat (100) and the second slat (200) defining a slat gap (90) between the first aft side portion (154) and the second aft side portion (258), the slat gap (90) being substantially parallel to a predetermined local airflow direction.

CLAUSE 2: The wing assembly (15) of clause 1, further comprising a flexible sealing member (80) disposed between the first slat (100) and the second slat (200), the flexible sealing member (80) extending from the first and second leading edges (151, 251) to the first and second intermediate points (155, 255).

CLAUSE 3: The wing assembly (15) of clause 2, wherein a forward edge of the slat gap (90) is defined by a trailing edge of the flexible sealing member (80).

CLAUSE 4: The wing assembly (15) of clause 2, wherein the flexible sealing member (80) is a rubber seal connected between the first forward side portion (153) and the second forward side portion (257).

CLAUSE 5: The wing assembly (15) of clause 1, wherein the predetermined local airflow direction is aligned with a streamwise direction (70) of airflow.

CLAUSE 6: The wing assembly (15) of clause 1, wherein the predetermined local airflow direction is aligned with a direction of airflow impacting at least one of the first leading edge (151) and the second leading edge (251), when the wing assembly (15) is installed on an aircraft (10) and the aircraft (10) is in operation.

CLAUSE 7: The wing assembly (15) of clause 1, wherein orientation of the slat gap (90) causes a reduction in noise when the wing assembly (15) is installed on an aircraft (10), the first and second slats (100, 200) are in an intermediate position, and air is flowing over the wing assembly (15) compared to an other swept wing assembly (15') with a pair of other slats (50) forming a gap co-linear with corresponding forward side lines of the other slats.

CLAUSE 8: The wing assembly (15) of clause 1, wherein: the first leading edge (151) defines a first leading edge line (161) connecting forward-most points of the first slat (100) and extending between a first inboard end (172) and a first outboard end (171); the first trailing edge (152) defines a first trailing edge line (162) connecting aft-most points of the first slat (100) and extending between the first inboard end and the first outboard end, the first trailing edge (152) being disposed at a first chord distance (180) from the first leading edge (151); the first leading edge line (161) and the first trailing edge line (162) define a first slat plane (150), the first chord distance (180) between the first leading edge (151) and the first trailing edge (152) extending normal to the first leading edge (151), the first chord distance (180) being measured along the first slat plane (150); a projection of the first forward side portion (153) onto the first slat plane (150) defines a first forward side line (165); a projection of the first aft side portion (154) onto the first slat plane (150) defining a first aft side line (166); a second leading edge (251) defines a second leading edge line (261) connecting forward-most points of the second slat (200) and extending between a second inboard end (272) and a second outboard end (271); a second trailing edge (252) defines a second trailing edge line (262) connecting aft-most points of the second slat (200) and extending between the second inboard end and the second outboard end, the second trailing edge (252) being disposed at a second chord distance (280) from the second leading edge (251); the second leading edge line (261) and the second trailing edge line (262) defining a second slat plane (250), the second chord distance (280) between the second leading edge (251) and the second trailing edge (252) extending normal to the second leading edge (251), the second chord distance (280) being measured along the second slat plane (250); a projection of the second forward side portion (257) onto the second slat plane (250) defines a second forward side line (265); a projection of the second aft side portion (258) onto the second slat plane (250) defines a second aft side line (266); and the first aft side line (166) and the second aft side line (266) are substantially parallel to a predetermined local airflow direction.

CLAUSE 9: The wing assembly (15) of clause 8, wherein the first trailing edge line (162) is longer than the second trailing edge line (262).

CLAUSE 10: The wing assembly (15) of clause 8, wherein: the first leading edge line (161) and the second leading edge line (261) are equal in length; and a surface area of the first slat plane (150) is greater than a surface area of the second slat plane (250).

CLAUSE 11: The wing assembly (15) of clause 8, wherein the first aft side line (166) and the second aft side line (266) are substantially parallel to a longitudinal centerline (30) of the aircraft (10) when the wing assembly (15) is installed on the aircraft (10).

CLAUSE 12: The wing assembly (15) of clause 8, wherein the first chord distance (180) and the second chord distance (280) are equal in length.

CLAUSE 13: The wing assembly (15) of clause 12, wherein each of the first forward side line (165) and the second forward side line (265) extend for at least 65% of the first chord distance (180).

CLAUSE 14: The wing assembly (15) of clause 12, wherein each of the first forward side line (165) and the second forward side line (265) extend for 95% or less of the first chord distance (180).

CLAUSE 15: The wing assembly (15) according to clause 8, wherein: the first forward side line (165) is a straight line; and the second forward side line (265) is a straight line.

CLAUSE 16: The wing assembly (15) according to clause 8, wherein: the first aft side line (166) is a straight line; and the second aft side line (266) is a straight line.

CLAUSE 17: The wing assembly (15) of clause 1, wherein: an outboard side of the first forward side line (165) and an outboard side of the first aft side line (166) define a first angle (199) therebetween; an outboard side of the second forward side line (265) and an outboard side of the second aft side line (266) define a second angle (299) therebetween; the first angle (199) is less than 175 degrees; and the second angle (299) is less than 175 degrees.

CLAUSE 18: The wing assembly (15) of clause 17, wherein: the first angle (199) is greater than 135 degrees; and the second angle (299) is greater than 135 degrees.

CLAUSE 19: The wing assembly (15) of clause 17, wherein the first angle (199) is equal to the second angle (299).

CLAUSE 20: An aircraft (10) comprising: a fuselage; and two oppositely disposed wing assemblies (15) connected to the fuselage (12), each of the two oppositely disposed wing assemblies (15) being a wing assembly (15) according to any one clauses 1 to 19.

CLAUSE 21: A wing assembly (15) comprising: a swept wing body (20), a leading edge (16) of the wing body (20) extending outward and rearward from a wing root (22) to a wing tip (23); a first slat (100) selectively movably connected to the wing body (20); and a second slat (200) selectively movably connected to the wing body (20), the second slat (200) being disposed outboard of the first slat (100), a flexible sealing member (80) disposed and connected between the first slat (100) and the second slat (200); at least a portion of the first slat (100), at least a portion of the second slat (200), and at least a portion of the flexible sealing member (80) defining a slat gap (90) therebetween, at least a majority of the slat gap (90) being substantially parallel to a predetermined local airflow direction.

The specification is not intended to limit the aspects of embodiments of the present technology as recited in the claims below. Modifications and improvements to the above-described embodiments of the present technology may become apparent to those skilled in the art. The foregoing description is intended to be exemplary rather than limiting.

What is claimed is:

1. A wing assembly comprising:
a swept wing body, a leading edge of the wing body extending outward and rearward from a wing root to a wing tip;
a first slat selectively movably connected to the wing body, the first slat including:
a first leading edge and a first trailing edge;
a first inboard edge extending between the first leading edge and the first trailing edge and a first outboard edge extending between the first leading edge and the first trailing edge, the first outboard edge including:
a first forward side portion extending from the first leading edge to a first intermediate point between the first leading edge and the first trailing edge, and
a first aft side portion extending from the first intermediate point to the first trailing edge; and
a second slat selectively movably connected to the wing body, the second slat being disposed outboard of the first slat, the second slat including:
a second leading edge and a second trailing edge;
a second outboard edge extending between the second leading edge to the second trailing edge; and
a second inboard edge extending between the second leading edge to the second trailing edge, the second inboard edge including:
a second forward side portion extending from the second leading edge to a second intermediate point between the second leading edge and the second trailing edge, and
a second aft side portion extending from the second intermediate point to the second trailing edge;
the first slat and the second slat defining a slat gap between the first aft side portion and the second aft side portion,
the slat gap being parallel to a longitudinal centerline of an aircraft when the wing assembly is installed on the aircraft,
wherein:
the first leading edge defines a first leading edge line connecting forward-most points of the first slat and extending between a first inboard end and a first outboard end;
the first trailing edge defines a first trailing edge line connecting aft-most points of the first slat and extending between the first inboard end and the first outboard end, the first trailing edge being disposed at a first chord distance from the first leading edge;
the first leading edge line and the first trailing edge line define a first slat plane, the first chord distance between the first leading edge and the first trailing edge extending normal to the first leading edge, the first chord distance being measured along the first slat plane;
a projection of the first forward side portion onto the first slat plane defines a first forward side line;
a projection of the first aft side portion onto the first slat plane defining a first aft side line;
the second leading edge defines a second leading edge line connecting forward-most points of the second slat and extending between a second inboard end and a second outboard end;
the second trailing edge defines a second trailing edge line connecting aft-most points of the second slat and extending between the second inboard end and the second outboard end, the second trailing edge being disposed at a second chord distance from the second leading edge;
the second leading edge line and the second trailing edge line defining a second slat plane, the second chord distance between the second leading edge and the second trailing edge extending normal to the second leading edge, the second chord distance being measured along the second slat plane;
a projection of the second forward side portion onto the second slat plane defines a second forward side line;
a projection of the second aft side portion onto the second slat plane defines a second aft side line; and
the first aft side line and the second aft side line are parallel to the longitudinal centerline of the aircraft when the wing assembly is installed on the aircraft.

2. The wing assembly of claim 1, further comprising a flexible sealing member disposed between the first slat and the second slat, the flexible sealing member extending from the first and second leading edges to the first and second intermediate points.

3. The wing assembly of claim 2, wherein a forward edge of the slat gap is defined by a trailing edge of the flexible sealing member.

4. The wing assembly of claim 2, wherein the flexible sealing member is a rubber seal connected between the first forward side portion and the second forward side portion.

5. The wing assembly of claim 1, wherein the first trailing edge line is longer than the second trailing edge line.

6. The wing assembly of claim 1, wherein:
the first leading edge line and the second leading edge line are equal in length; and
a surface area of the first slat plane is greater than a surface area of the second slat plane.

7. The wing assembly of claim 1, wherein the first chord distance and the second chord distance are equal in length.

8. The wing assembly of claim 7, wherein each of the first forward side line and the second forward side line extend for at least 65% of the first chord distance.

9. The wing assembly of claim 7, wherein each of the first forward side line and the second forward side line extend for 95% or less of the first chord distance.

10. The wing assembly according to claim 1, wherein:
the first forward side line is a straight line; and
the second forward side line is a straight line.

11. The wing assembly according to claim 1, wherein:
the first aft side line is a straight line; and
the second aft side line is a straight line.

12. The wing assembly of claim 1, wherein:
an outboard side of the first forward side line and an outboard side of the first aft side line define a first angle therebetween;
an outboard side of the second forward side line and an outboard side of the second aft side line define a second angle therebetween;
the first angle is less than 175 degrees; and
the second angle is less than 175 degrees.

13. The wing assembly of claim 12, wherein:
the first angle is greater than 135 degrees; and
the second angle is greater than 135 degrees.

14. The wing assembly of claim 12, wherein the first angle is equal to the second angle.

15. An aircraft comprising:
a fuselage; and
two oppositely disposed wing assemblies connected to the fuselage, each of the two oppositely disposed wing assemblies being a wing assembly according to claim 1.

* * * * *